US00RE38612E1

(19) United States
(12) Reissued Patent
Tucker et al.

(10) Patent Number: US RE38,612 E
(45) Date of Reissued Patent: Oct. 5, 2004

(54) ROUTER TABLE FENCE SYSTEM

(75) Inventors: Edwin C. Tucker, Ottawa (CA); Michael S. McGuire, Ottawa (CA); Leonard G. Lee, Almonte (CA); John S. Lynn, Ontario (CA)

(73) Assignee: Lee Valley Tools, Ltd., Ottawa (CA)

(21) Appl. No.: 10/092,960

(22) Filed: Feb. 28, 2002

Related U.S. Patent Documents

Reissue of:
(64) Patent No.: 5,779,407
Issued: Jul. 14, 1998
Appl. No.: 08/791,818
Filed: Jan. 30, 1997

U.S. Applications:
(60) Provisional application No. 60/010,975, filed on Feb. 1, 1996.

(51) Int. Cl.[7] ..... B27B 31/00; B23C 1/12
(52) U.S. Cl. ..... 409/218; 144/252.1; 144/253.1; 269/303; 409/226
(58) Field of Search ..... 15/300.1, 301, 15/306.1; 144/251.2, 252.1, 253.1, 253.2, 135.2; 269/303, 304, 315; 409/218, 226

(56) References Cited

U.S. PATENT DOCUMENTS 5,016,693 A * 5/1991 Haffely et al. ..... 144/253.2
5,325,900 A * 7/1994 Garuglieri ..... 144/253.2
5,443,554 A * 8/1995 Robert ..... 269/303
5,553,644 A * 9/1996 Adams ..... 144/253.2

OTHER PUBLICATIONS

CMT Tools Catalog 18, 1995–96, p. 44.*
Highland Hardware Early Fall 1993 Sale Catalog, pp. 46–48.*
Lee Valley Catalog entitled *Fine Woodworking Tools* 1991–92, p. 108.*
McFeely's Square Drive Screws Catalog, ©1995 McFeely's, pp. 60–61.*
The Woodworker's Store® 1993–94 Catalog #C–93, pp. 99–100.*
Trend–lines® Woodworkers Warehouse™ Catalog 508H, ©1993 Trend–Lines, Inc., pp. 10, 42.*
Woodcraft® Jan. 1996 Catalog, p. 74.*
Woodhaven Catalog entitled *Uncommon Woodworking Tools*, ©1995, Woodhaven, Inc., pp. 3, 5, 10–13.*

(List continued on next page.)

*Primary Examiner*—Mark Rosenbaum
(74) *Attorney, Agent, or Firm*—Kilpatrick Stockton; John S. Pratt; Kristin L. Johnson

(57) ABSTRACT

A router table fence having three nesting aluminum extrusions or spars, two of which lie under a longer third spar. By positioning the inner ends of the two lower spars adjacent to a router cutter protruding through a router table, it is possible to provide a fence, particularly when the lower spars are used with wood facings or sub-fences, that can be adjusted to closely surround the cutter. Lateral movement of the fence assembly adjusts the amount of cutter that contacts a workpiece manipulated past the cutter while contacting the fence. The cross sectional shapes of the spars are identical and are generally square, with structure that permits the upper, longer spar to rest on top of, and be attached in a manner permitting it to slide against, the lower two spars. T-shaped slots in each face of the spars accept fasteners that connect the spars together and also accept fasteners for a variety of accessories, such as hold-down devices and shields. Fence locks attach the fence to a variety of router table tops without the need for fence-receiving structures separately attached to the router table or table top. A micro-adjust stop can be used in cooperation with the fence locks to make very accurate and predictable adjustments in the position of the fence on a router table top. By using a shim behind one of the sub-fences in order to position it parallel to, but slightly offset from, the other sub-fence, it is possible to joint a surface of a board using a "straight" cutter.

45 Claims, 6 Drawing Sheets

OTHER PUBLICATIONS

Woodworker's Supply, Inc., Catalog #76, Aug. 1992, p. 36.*
Jul. 2, 2001 letter to R. Warren Comstock, Esq. from Roger D. Greer of Greer, Burns & Crain, Ltd.
Exhibit 1: CRAFTMAN® Professional Router Table Fence, Owner's Manual Model No. 9–26472.
Exhibit 2: U.S. Pat. No. 5,553,644 to Adams, entitled *Fence for Woodworking Machine*, issued Sep. 10, 1996.
Exhibit 3: Scheppach Katalog, 1994.
Exhibit 4: Taunton's Fine WoodWorking, Fence and Chip–Collection System, Oct. 1991 No. 90.
Exhibit 5: Taunton's Fine WoodWorking, Smart Fence Plus, Advertisement from Join Tech, Oct. 1994 No. 108.
Exhibit 6: Bench Dog.
Nov. 7, 2001 letter to R. Warren Comstock from John D. Gould of Merchant & Gould.
Exhibit 1: U.S. Pat. No. 5,779,407 to Tucker et al., entitled *Router Table Fence System*, issued Jul. 14, 1998.
Exhibit 2: CRAFTMAN® Professional Router Table Fence, Owner's Manual Model No. 9–26472.
Exhibit 3: CRAFTSMAN® table fence photographs.
Exhibit 4: JoinTech, SMART FENCE® Plus Model SF–32 photographs.
Exhibit 5: JoinTech, SMART FENCE® Plus Model SF–32, Owners Manual.
Exhibit 6: JoinTech, Smart Fence Plus Mounting Brackets, SF–MB2, Parts List with instructions.
Exhibit 7: Taunton's Fine WoodWorking, Oct. 1994, p. 123 showing SMART FENCE® advertisement.
Exhibit 8: Taunton's Fine WoodWorking, Oct. 1991, showing SMART FENCE® advertisement.
Exhibit 9: American Woodworker Magazine, Reprint from Aug. 1995 Issue.
Exhibit 10: U.S. Pat. No. 5,553,644 to Adams entitled *Fence for Woodworking Machine*, issued Sep. 10, 1996.
Exhibit 11: ShopNotes, 1992, No. 1, entitled *Complete Router Table*.
Exhibit 12: Prototype of Exhibit 11 Photographs.

* cited by examiner

ROUTER TABLE FENCE SYSTEM

Matter enclosed in heavy brackets [ ] appears in the original patent but forms no part of this reissue specification; matter printed in italics indicates the additions made by reissue.

REFERENCE TO PROVISIONAL APPLICATION

This application claims the benefit of U.S. Provisional application Ser. No. 60/010,975, filed Feb. 1, 1996, the entire contents of which are incorporated herein by this reference.

BACKGROUND OF THE INVENTION

This invention relates to router tables and fences for use with router tables.

Because of their versatility, electric routers are very widely used in woodworking, particularly in home and small commercial shops. Such routers use a powerful electric motor in a housing to which handles are attached for holding and manipulating the tool. The motor shaft terminates in a collet adapted to receive the shank of a router bit or cutter, and a base attaches to the housing and surrounds the cutter so that a portion of the cutter may protrude beyond the base, which bears against a workpiece during use of the router. The position of the base is adjustable up and down parallel to the rotating axis of the collet and cutter, and in plunge routers the relative position of the base and router cutter can change during use of the tool in order to "plunge" the cutter into the workpiece. Electric routers are generally intended to be used by moving the router relative to a stationary workpiece, with a portion of the router base bearing against the workpiece.

Substantial additional versatility can be achieved by mounting a router in an inverted position with the router cutter protruding up through an opening in a relatively large, flat work surface to provide, in effect, a shaper. With this arrangement, a workpiece lying on top of the work surface can be manipulated relative to the stationary router and a rotating router cutter, the position of which does not move relative to the workpiece. Such router tables are commercially available in a variety of configurations, and numerous plans for homemade router tables are also available.

Many commercially available router tables are provided with fences, and fences for both commercial and homemade router tables are frequently made by users by clamping or otherwise fixing a length of wood to the router table top. Because most router table operations using a fence require that only a portion of the router cutter protrude beyond the face of the fence, provision typically needs to be made for locating the fence at least partly around the cutter. This is sometimes accomplished by machining a slot or recess in the fence within which a portion of the cutter is positioned.

Such shop-made fences, and many of the commercially manufactured fences, suffer from a variety of deficiencies. For instance, many are difficulty to position, reposition or adjust accurately. Some have insufficient strength to resist deformation during use, and many do not easily accommodate chip and dust removable accessories. It is very typically desirable to use work hold-down and safety shield accessories with router table fences, and many fences accept attachment of such accessories only with difficulty, if at all.

It is thus among the objects of the present invention to provide a router table fence that is straight, rigid, easily adjusted and which accommodates good chip escape.

It is a further object of the present invention to provide a router table fence that can be easily used in jointing a work surface.

It is another object of the present invention to provide a router table fence that will easily accommodate a wide variety of additional shop-made and commercially available accessories.

These and other objects of the present invention will become apparent from the following description of the invention, the accompanying drawings and the claims.

SUMMARY OF THE INVENTION

The router table fence of the present invention uses three nesting extrusions or spars, two of which lie under a longer third spar. By positioning the inner ends of the two lower spars adjacent to a router cutter protruding through a router table, it is possible to provide a fence, particularly when the lower spars are used with wood facings, that can be adjusted to closely surround the cutter. Lateral movement of the fence assembly adjusts the amount of cutter that contacts a work piece manipulated past the cutter while contacting the fence.

The cross sectional shapes of the spars are typically identical and are generally square, with structure that permits the upper, longer spar to rest on top of, and be attached in a manner permitting it to slide against, the lower two spars. Tee-shaped slots in each face of the spars accept fasteners that connect the spars together. Such tee-shaped slots also accept fasteners for a variety of accessories, such as hold-down devices and shields. Fence locks attach the fence to a variety of router table tops without the need for fence-receiving structures separately attached to the router table or table top. The fence locks of the present invention can be used for many top thicknesses but work particularly well with thin tops.

A micro-adjust stop can be used in cooperation with the fence locks to make very accurate and predictable adjustments in the position of the fence on a router table top.

Wood sub-fences attached to the lower fence spars can be cut by a router cutter to fit very closely around the profile of the cutter to facilitate chip removal and to reduce tear-out in the work piece. By using a shim behind one of the sub-fences in order to position it parallel to, but slightly offset from, the other sub-fence, it is possible to joint a surface of a board using a "straight" cutter.

Among the shields easily attached to the fence of the present invention is one that can be formed from a single sheet of suitable plastic like polycarbonate or acrylic with a 90° bend joining a semicircular (horizontal) portion that lies above the router cutter in use to a rectangular (vertical) portion with two screw-receiving vertical slots for receiving screws that are threaded into nuts within one of the fence tee-shaped slots to mount the shield where needed. The shield can be mounted directly against the fence when the cutter being shielded is in that location. In other instances, particularly where wood sub-fences are used, longer screws can pass through the shield and then through stand-offs that position the shield at a desirable location (above the router cutter) away from the fence.

DETAILED DESCRIPTION OF THE DRAWINGS

Figure 1:
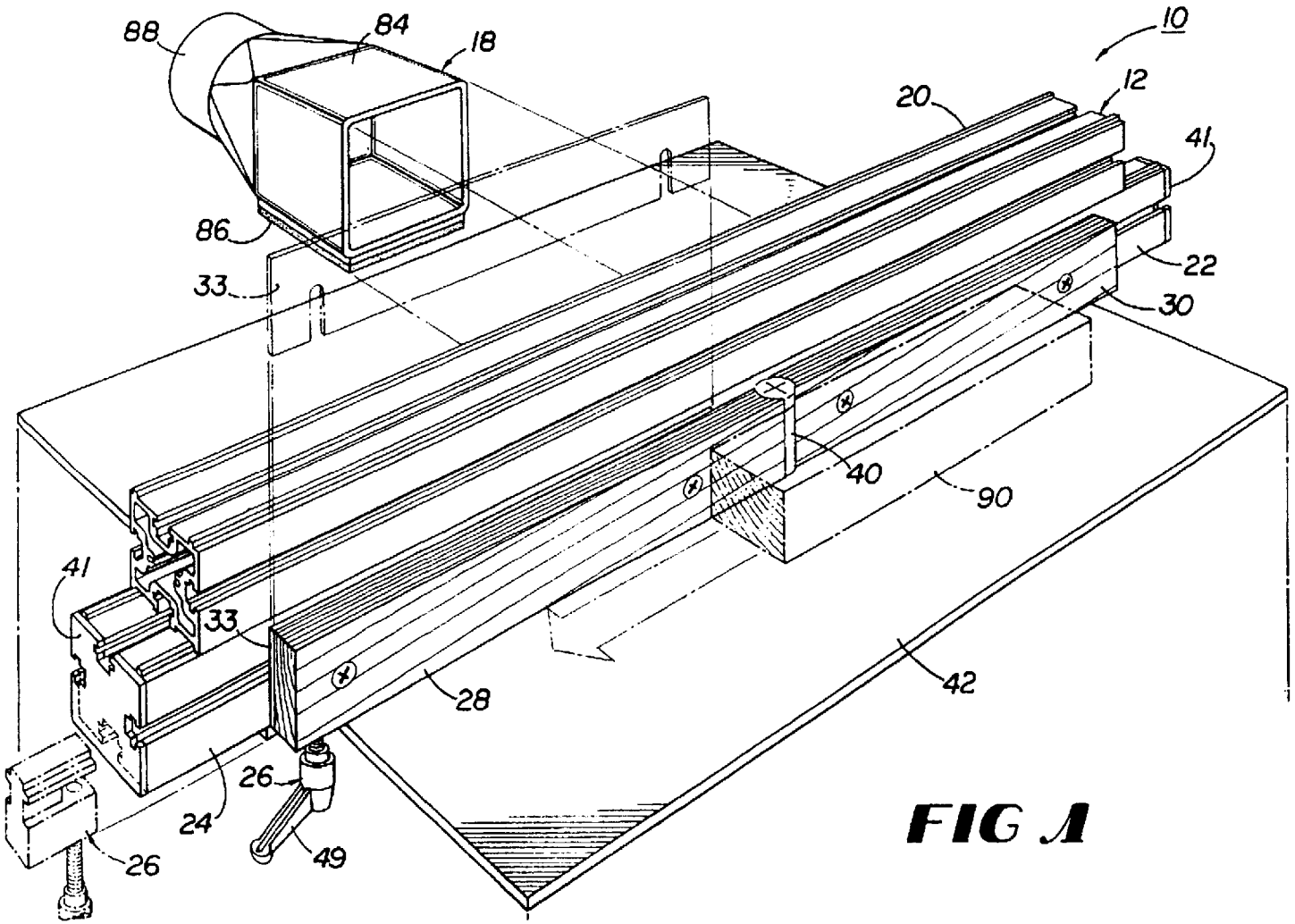
FIG. 1 is a perspective view of the front and left end of the router table fence of the present invention, shown positioned on a router table top.
Figure 2:
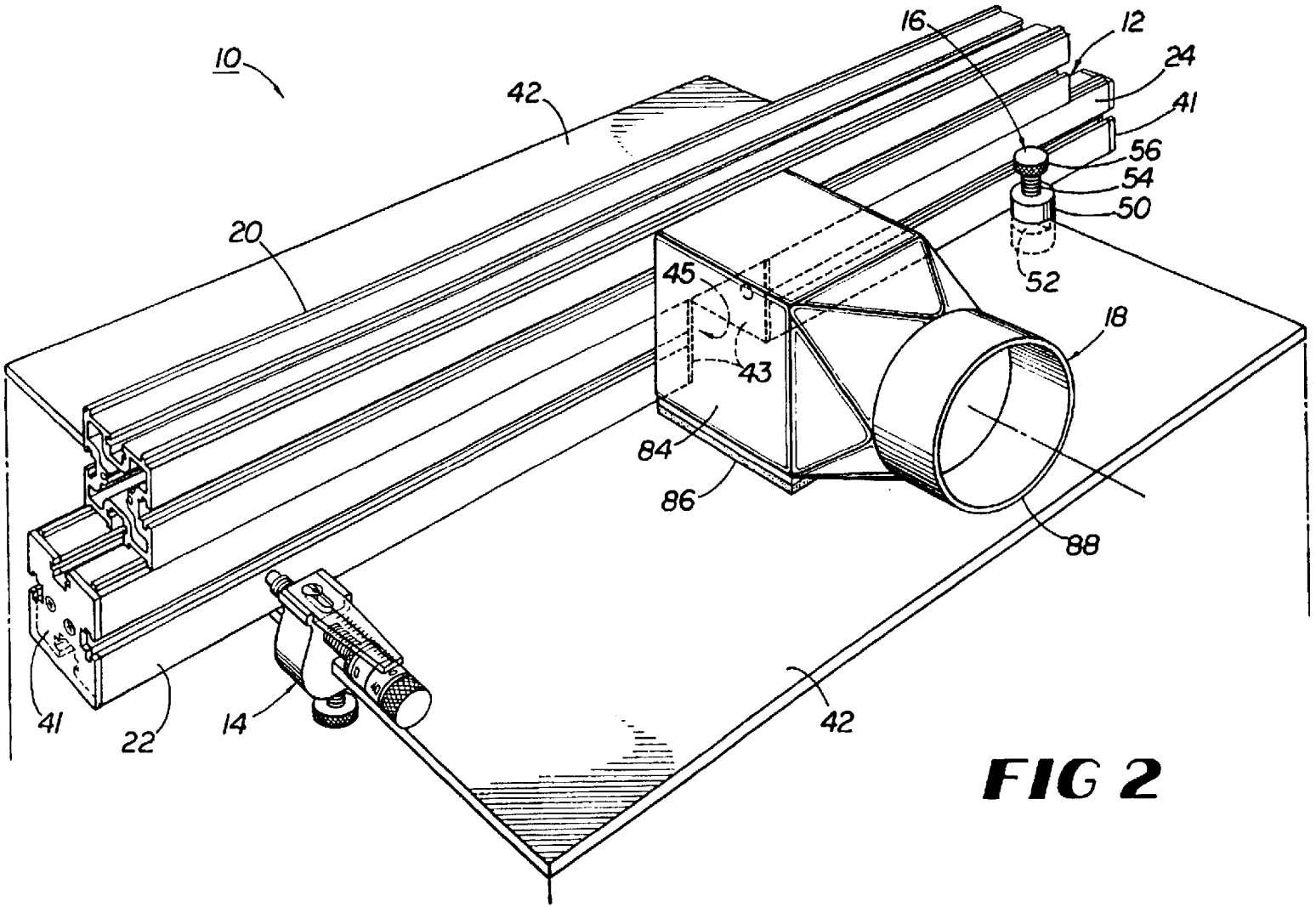
FIG. 2 is a perspective view of the rear and right end of the router table fence of the present invention, also shown positioned on a router table top together with the micro-adjust fence positioning stop of the present invention.

The router table fence system 10 of the present invention is illustrated in front and rear perspective views in FIGS. 1 and 2, respectively. The system 10 includes a fence 12, micro-adjust stop 14, fixed stop 16, and dust chute 18. The figures illustrate use of the system on a relatively thin router table top 42 that is typically steel.

Figure 7:
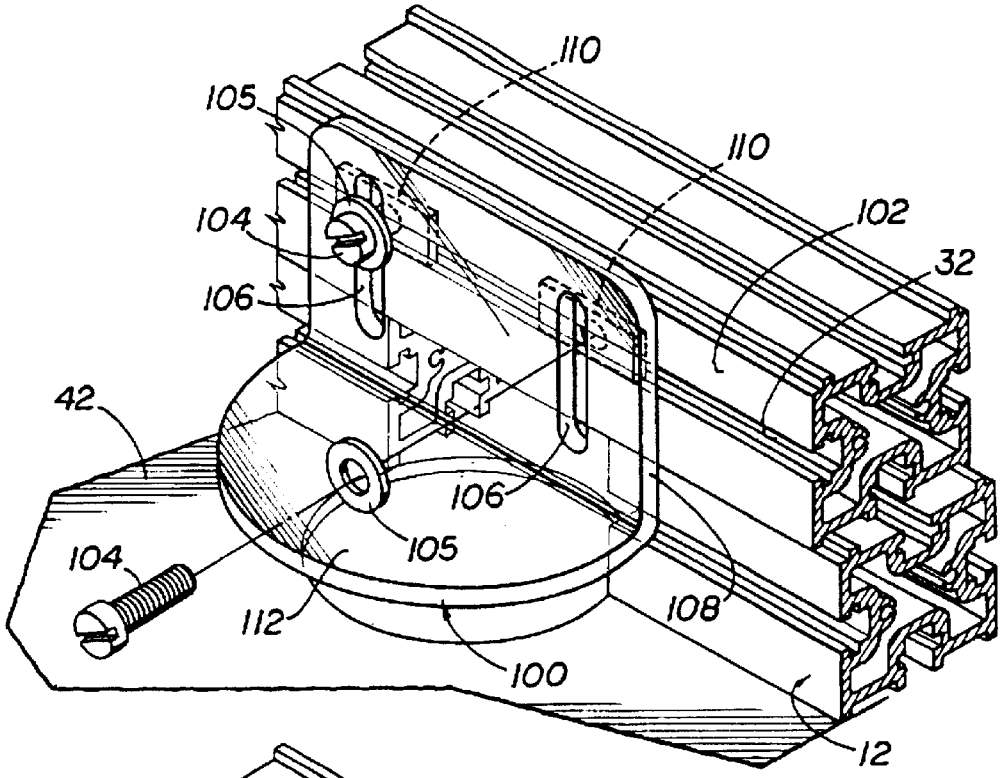
FIG. 7 is a perspective view of a portion of the face of the fence of the present invention showing a fence-mounted safety shield mounted directly to the fence.
Figure 8:
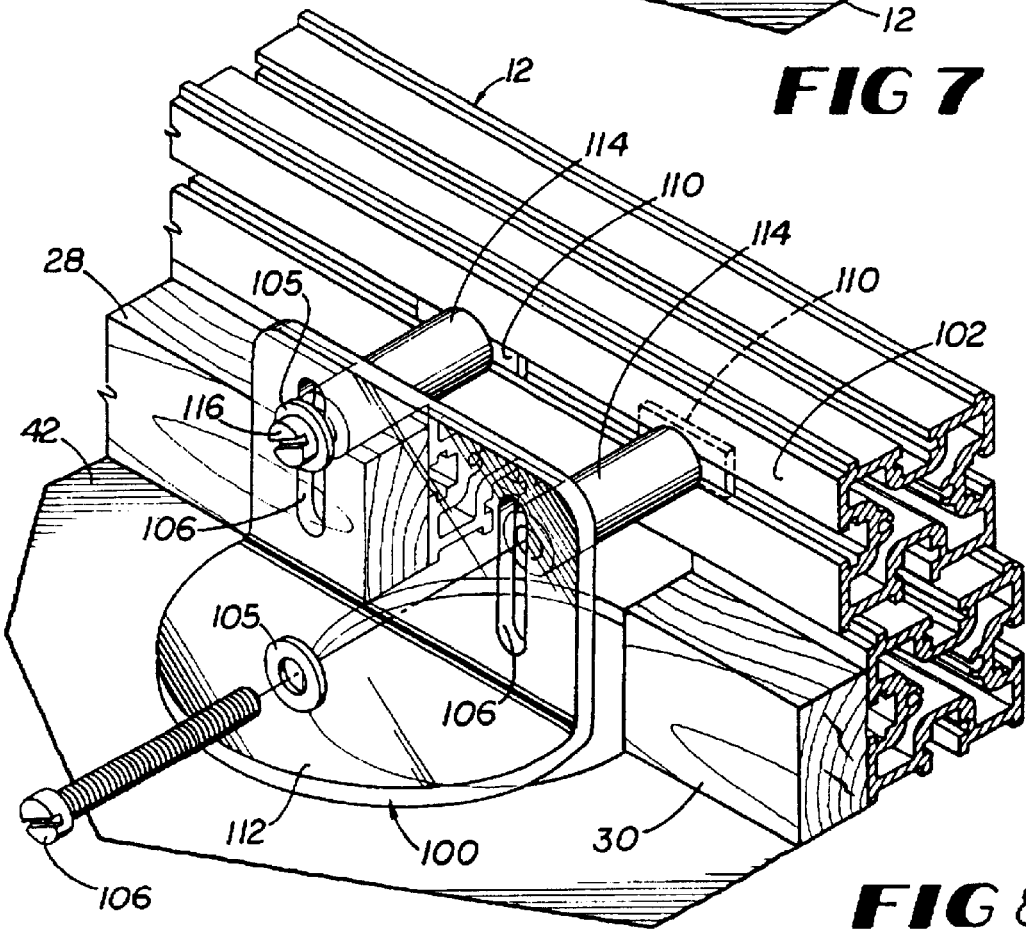
FIG. 8 is a perspective view of a portion of the face of the fence of the present invention with wood sub-fences mounted in place and the safety shield shown in FIG. 7 shown positioned away from the fence with spacers.

A safety shield 100 is shown mounted directly to the fence 12 in FIG. 7 and spaced away from fence 12 in FIG. 8. A hold-down assembly 120 is illustrated mounted on fence 12 in FIG. 9.

Figure 4:
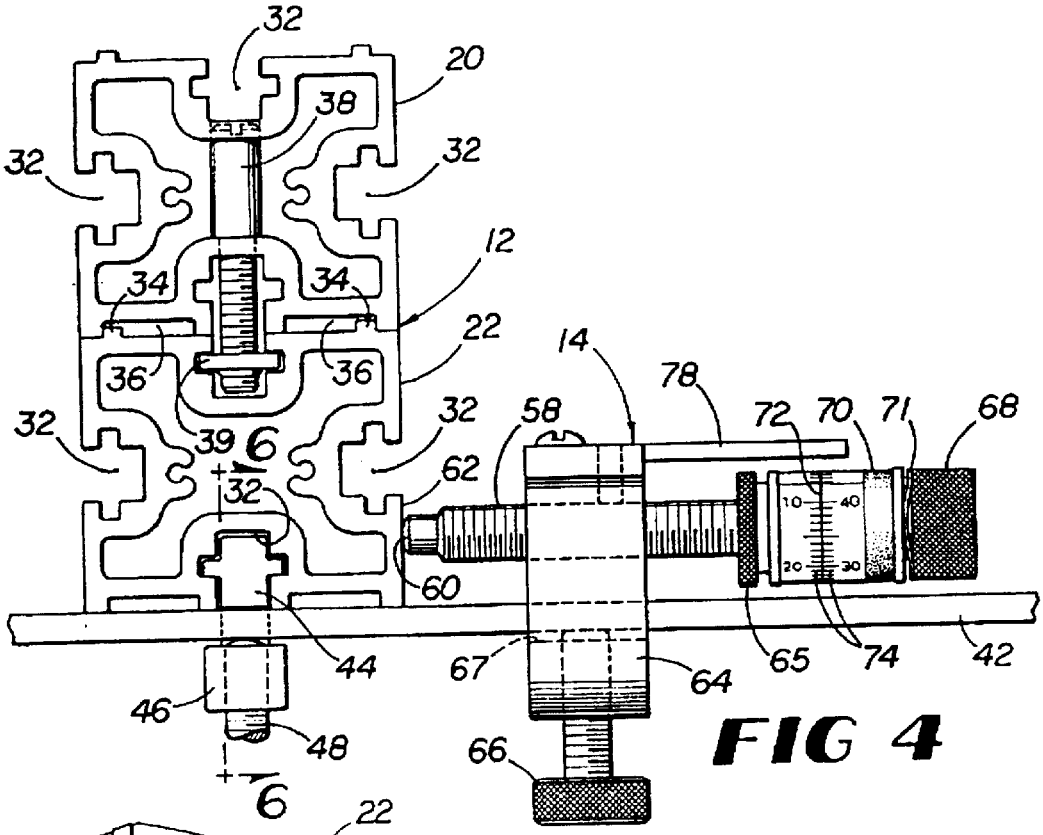
FIG. 4 is an elevation view of the right end of the router table fence of the present invention together on a router table top with the micro-adjust fence stop of the present invention.

As is illustrated in FIGS. 1, 2 and 4, fence 12 includes an extruded aluminum upper spar 20, extruded aluminum lower spars 22 and 24, two fence locks 26, sub-fences 28 and 30, and jointing spacers 33.

As will be appreciated by reference to FIG. 4, the cross-sectional shapes of upper spar 20 and lower spar 22 are identical. Each spar 20 and 22 is generally a rectangle in cross-section, having four sides, opposed pairs of which are equal. As illustrated in the figures all sides of the cross-sectional shape of the spars 20 and 22 may be substantially equal, resulting in a square cross-section. A longitudinal T-slot is centered in each of the four faces of the spar. Each spar, 20 and 24 also has two upstanding ribs 34. Upstanding ribs 34 on the top of the lower spars 22 and 24 that are received in longitudinal slots or depressions 36 in the bottom of upper spar 20, so that lower spars 22 and 24 may slide longitudinally relative to each other while maintaining vertical alignment with upper spar 20.

Screws 38 having a long rod-shaped head connect the upper spar 20 to lower spars 22 and 24 by passing through spar 20 and into nuts 39 located in the upper T-slot 32 in spars 22 and 24.

Plastic end caps [(not shown)] *41* (*FIGS. 1 and 2*) on the ends of the spars prevent T-nuts from falling out of T-slots 32 and seal the lower spars 22 and 24 to improve dust removal.

As will be appreciated by reference to the figures, particularly FIG. 2, the ability of lower spars 22 and 24 to move toward or away from each other permits upper spar 20 and lower spars 22 and 24 to be positioned in a variety of desirable locations relative to a router cutter 40, including locations where a portion of the cutter 40 is surrounded by the fence 12.

Fence 12 is locked in position on a router table top 42 by fence locks 26 that have a cross-sectional shape permitting a head 44 of fence lock 26 to be received in a T-slot 32 on the bottom of one of lower spars 22 or 24. A foot 46 of fence lock 26 protrudes under router table top 42 and carries a threaded rod 48, preferably brass, to which a gyratory handle 49 is attached in order to rotate threaded rod 48 in order to press its tip 51 against the underside of table top 42.

Fixed stops 16 may be used to establish the position of fence 12 in order to make it possible to remove fence 12 and later return it to exactly the same position. Each fixed stop 16 is essentially a section of round rod 50 penetrated by a slot 52 that fits around an edge of router table top 42. An axial threaded hole receives a screw 54 with a knurled head 56.

Figure 5:
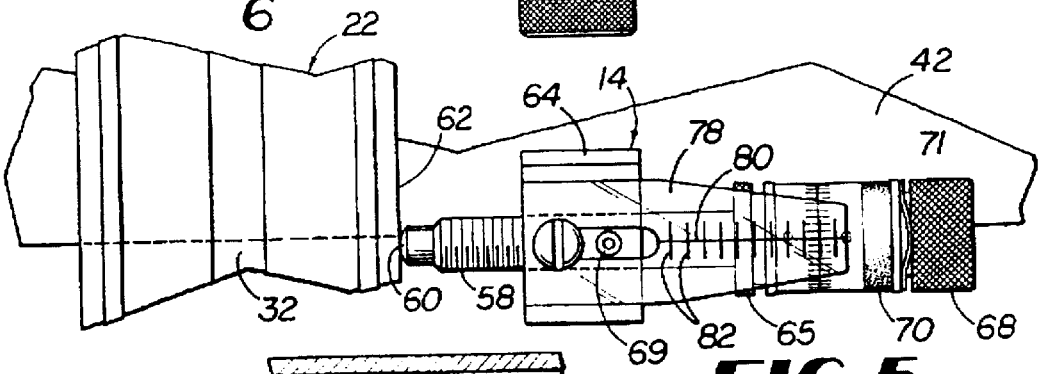
FIG. 5 is a top plan view of the micro-adjust fence stop shown in FIG. 4.
Figure 6:
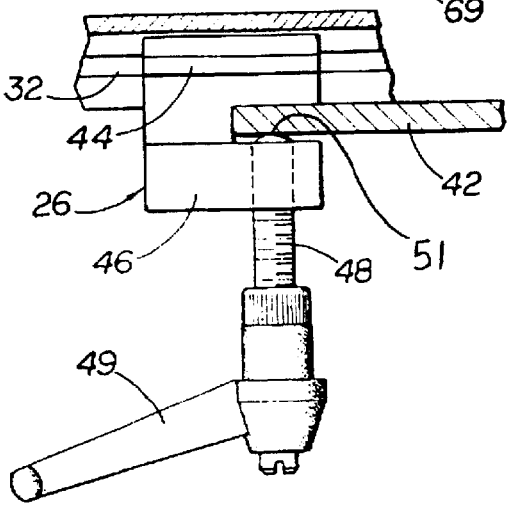
FIG. 6 is a rear elevation view of a fixed fence stop of the present invention shown on a router top edge fragment together with a fragment of the fence.

Accurate adjustment of the position of fence 12 may be accomplished with the assistance of micro-adjust stop 14, which is shown in side elevation and top plan views in FIGS. 4 and 5, respectively. In order to accomplish such adjustment, one end of fence 12 is fixed in position by locking the associated fence lock 26, and the other end of the fence is located in approximately the desired position. Micro-adjust stop 14 is then positioned on the edge of table top 42 with micro-adjust stop screw 58 end 60 in contact with the rear face 62 of fence 12.

Micro-adjust stop 14 includes a stop body 64 that is locked in position on an edge of router table top 42 with knurled head screw 66. Body 64 is penetrated by screw 58, preferably brass, that has a conical or round end 60 for contact with face 62 of the fence and, on the other end, a knurled knob 68 a barrel 70 marked with a ring 72 to establish lateral position and rotational position marks 74. A reference cursor 78 that may be a piece of acrylic or other clear plastic extends from body 64 over barrel 70. Cursor 78 has a longitudinal mark 80 and hash marks 82 transverse to longitudinal mark 80 which are separated from each other by 0.100 inches.

The thread on screw 58 is a double-start, twenty turns per inch thread, so that one complete revolution of screw 58 advances it by 0.100 inches. With the remote end of the fence 12 clamped in position, the center point of the fence (adjacent to the router cutter 40) will move 0.050 inches when the micro-adjust screw 58 is rotated one revolution and therefore moves by 0.100 inches the face 62 of fence 12 against which screw 58 end 60 bears. Barrel 70 is not threaded into screw 58 but rather can rotate or "float" on screw 58. Barrel 70 is held in position by a bent washer 71 between the barrel 70 and knurled head 68 and by a knurled nut 65. This permits barrel 70 to be rotated in order to "zero" it after contact with fence surface 62 is established. Each full rotation of screw may be read from the barrel 70 and cursor 78 markings as 0.050 inches of movement of the fence relative to cutter 40 at cutter 40.

Wood sub-fences 28 and 30 are typically used with fence 12 by fixing them to the appropriate face of each of lower spar 20 and 22. By sliding the sub-fences 28 and 30 toward cutter 40, when cutter 40 is rotating, the cutter 40 will cut the ends of the sub-fences 28 and 30 so that a "zero-clearance" relationship is established between the cutter and sub-fences 28 and 30. This reduces workpiece 90 tear-out, and also facilitates dust ejection by causing most of the material removed from workpiece 90 be ejected between the opposed ends of lower spars 20 and 22.

Such dust may be gathered with dust chute 18, which includes a generally rectangular housing 84 that may be conveniently positioned on ferrous metal router table top 42 with powerful rare earth (such as neodymium-iron-boron) magnets located on the bottom 86 of housing 84. Housing 84 attaches to a tubular extension 88, to which a dust removal system or vacuum cleaner may be attached. Alternatively, a short hose or length pipe may be attached to tubular extension 88 and terminated in a dust bin. With such an arrangement and positioning of sub-fences 28 and 30 as described above, most material removed from workpiece 90 will be driven into the receiving bin.

Figure 3:
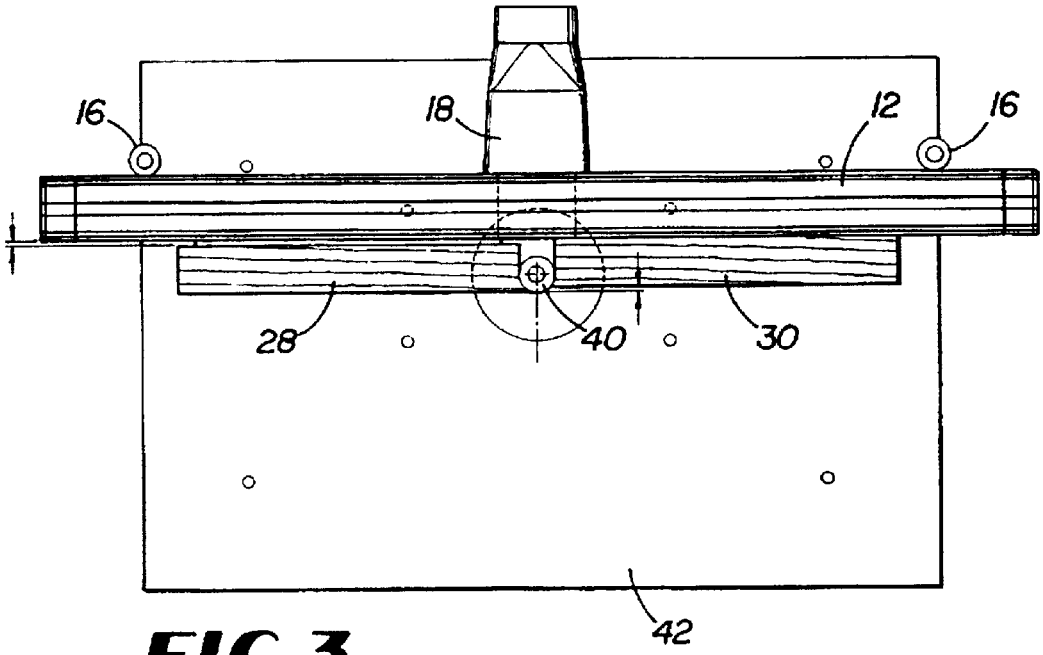
FIG. 3 is a top plan view of the fence of the present invention shown on a router table top and with two fixed stops and the dust chute of the present invention.
Figure 3A:
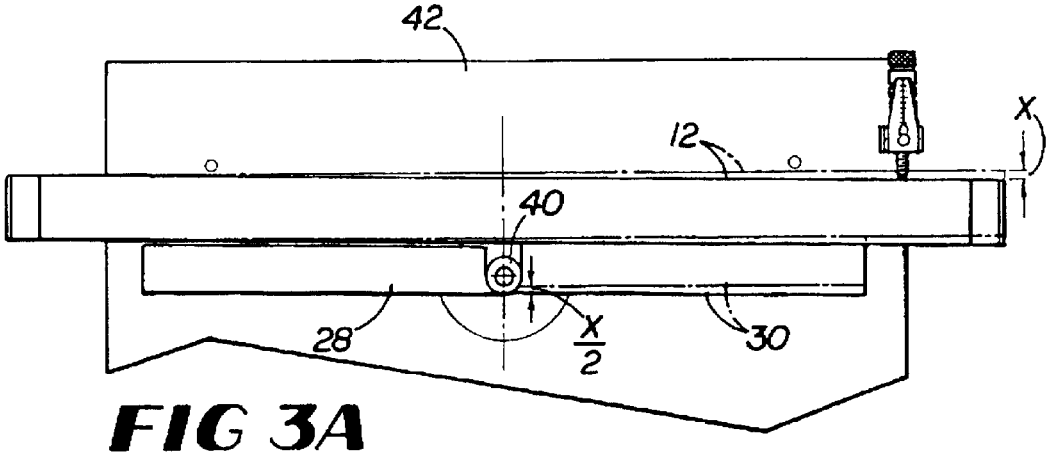
FIG. 3A is a top plan view similar to FIG. 3 illustrating use of the micro-adjust fence positioning stop.
Figure 3B:
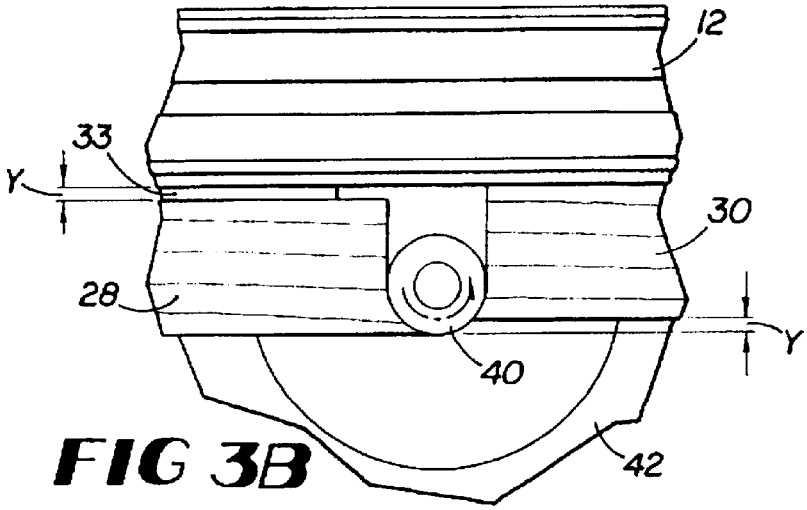
FIG. 3B is a fragmentary, enlarged view of the fence of the present invention in the vicinity of the router cutter.

As will be appreciated by those skilled in the art, in many routing or shaping operations, including, in particular, formation of ornamental edges on workpieces, sub-fences 28 and 30 should desirably be located in the same vertical plane. However, by positioning the surface of infeed sub-fence 30 within the cutting radius of a straight cutter 40, as shown in FIG. 3B, and positioning the surface of outfeed sub-fence 28 in alignment with the same cutting radius of cutter 40, it is possible to use the router table fence system 10 of the present invention for edge jointing. As will be appreciated by one skilled in the art by reference to FIG. 3B in particular, this will result in removal from a workpiece of a small amount of material and will provide an appropriately positioned outfeed reference surface.

In the present invention, such relative positioning of the sub-fences 28 and 30 may be rapidly and accurately accomplished by dropping a jointing spacer 33 (shown in FIG. 1 exploded away from the system 12) into position between outfeed sub-fence 28 and lower spar 24. Jointing spacers 33 may be made of a variety of materials and in a variety of thicknesses. The materials may include wood, metal and plastic. As can be seen in FIGS. 3 and 3B the amount of material removed from a workpiece in such a joining operation is established by the thickness "y" of the jointing spacer 33.

FIG. 7 illustrates safety shield 100 affixed directly to the front face 102 of fence 12 by passing screws 104 through washers 105 and vertical slots 106 in the vertical arm 108 of shield 100 and into T-nuts 110 received in a T-slot 32. This fixes vertical arm 108 of shield 100 directly against the front face 102 of fence 12 so that horizontal arm 112 of shield 100 extends horizontally out from the front face 102 of fence 12 above a router cutter (not shown) positioned immediately adjacent to fence 12 (or partially surrounded by fence 12). Safety shield 100 may be made of polycarbonate or acrylic plastic or a variety of other suitable materials, although transparent materials are preferable.

When safety shield 100 is used with fence 12 with sub-fences 28 and 30 (or the cutter is for some other reason spaced out from the front face 102 of fence 12), stand-off spacers 114 may be used with longer screws 116 as illustrated in FIG. 8 to appropriately position shield 100.

Figure 9:
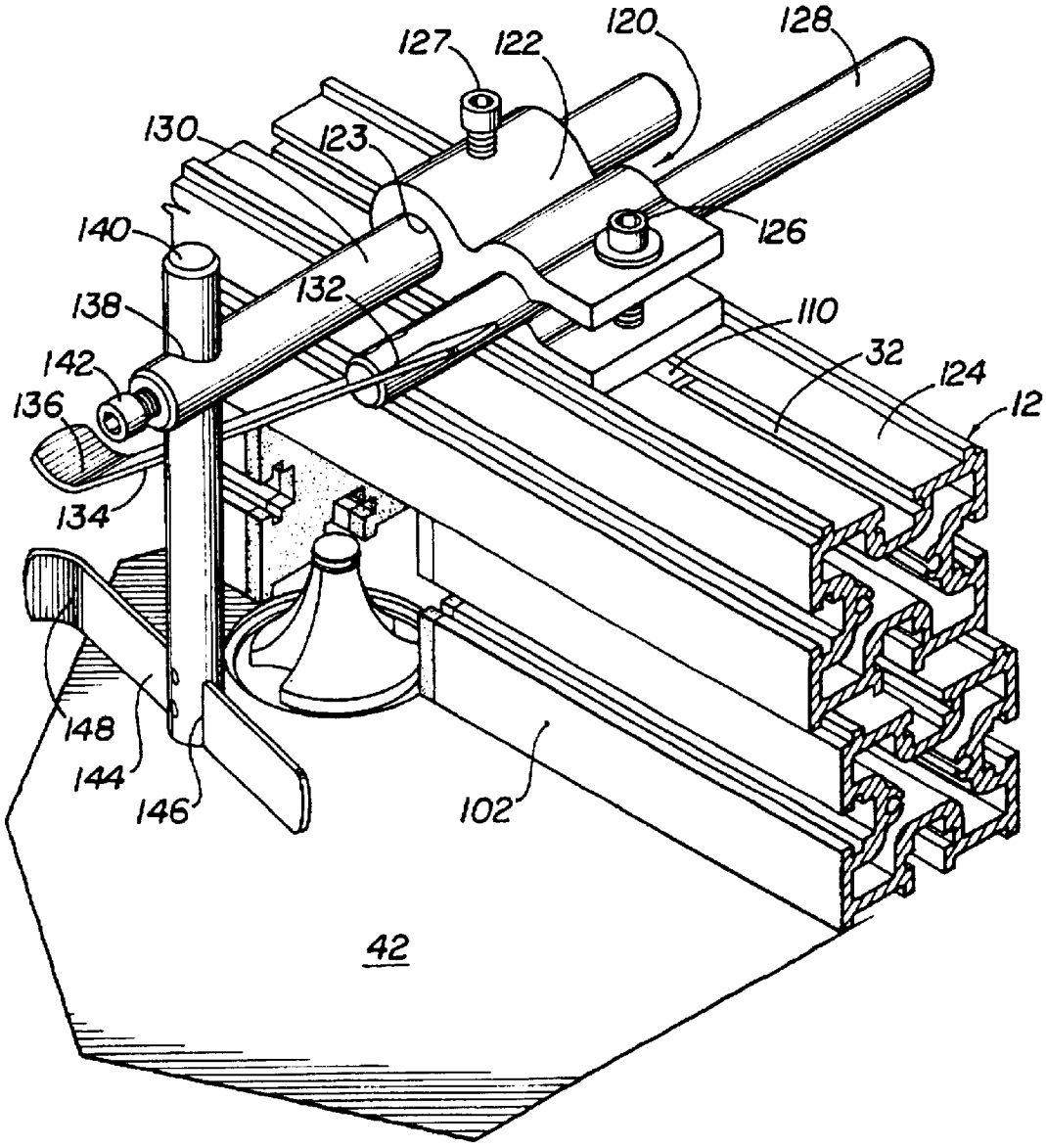
FIG. 9 is a perspective view of a portion of the face and top of the fence of the present invention shown with a work hold-down mounted thereon.

A hold-down assembly 120 may be easily positioned on fence 12 by affixing the body 122 to the top 124 of fence 12 by passing body cap screw 126 through body 122 and in to a tee-nut 110 in the T-slot 32 on the top 124 of fence 12, as illustrated in FIG. 9. Body 122 grasps two arms 128 and 130, each of which are round rods. Top spring arm 128 grasps, in a slot 132 in one end of arm 128, a top spring 134, which is a leaf spring having a curved end 136 positioned to press against the top of a workpiece (not shown) to urge it against the router table top 42. Arm 128 may be rotated within body 122 to increase or decrease the pressure exerted on a workpiece by spring 134.

Side spring arm 130 is also held within body 122 by positioning arm 130 in a bore 123 through body 122 and fixing it in position with a forward cap screw 127 threaded into body 122 to press against arm 130, permitting arm 130 to be moved in a direction normal to the front face 102 of fence 12. Side spring arm 130 has a transverse bore 138 that receives side spring post 140, which is fixed in position with a post screw 142 threaded into the end of arm 130 so that it intersects bore 138 and presses against post 140. Side spring 144 is fixed in a slot 146 in the lower end of post 140. Side spring 144 is a leaf spring similar to top spring 134, and it has a similar curved end 148 that is positioned to press against the side of a workpiece (not shown) opposite the front face 102 of fence 12 to thereby maintain constant contact between the fence and the workpiece during machining of the workpiece.

The router table fence and accessories of the present invention are not confined to the embodiments described herein but include variations and modifications within the scope and spirit of the foregoing description, the accompanying drawings and the following claims.

We claim:

1. A router table fence for use with a router table top, comprising:
   (a) a top spar having a first length and a front face,
   (b) two bottom spars having front faces, and
   (c) connectors for attaching the bottom spars to the top spar so that:
      (i) the front faces of each of the top spar and the two bottom spars are in substantially the same plane and
      (ii) opposed ends of the two bottom spars may be positioned either:
         (x) abutting, or
         (y) separated by a selected distance.

2. The router table fence of claim 1, further comprising two sub-fences, one of which is attached to the front face of each of the bottom spars, and each of which sub-fences has a working face for contact with workpieces.

3. The router table fence of claim 2, wherein the sub-fences are made of a material that can be machined with a router cutter.

4. The router table fence of claim 1, wherein the cross-sectional shape of each of the top and bottom spars is substantially identical.

5. The router table fence of claim 1, wherein the cross-sectional shape of each of the top and bottom spars is substantially a rectangle.

6. The router table fence of claim 1, wherein the cross-sectional shape of each of the top and bottom spars is substantially a square.

7. The router table fence of claim 1, wherein one of the top spar or the bottom spars has at least one rib that may be received in a depression in the other of the bottom spars or the top spar so that the bottom spars may slide longitudinally relative to the top spar while the bottom spars maintain vertical alignment relative to the top spar and each other.

8. The router table fence of claim 1, further comprising means for engaging the bottom spars with the top spar so that the bottom spars may slide longitudinally relative to the top spar while maintaining vertical alignment relative to each other.

9. The router table fence of claim 2, further comprising means for positioning the working face of one of the sub-fences in a plane parallel to but displaced from the plane within which the working face of the other sub-fence is located so that a straight cutter positioned to rotate tangent to the working face plane of the one sub-fence can produce a substantially flat surface on a workpiece fed from the other sub-fence face, into the cutter and onto the one sub-fence face.

10. The router table fence of claim 1, wherein the top spar has a top face orthogonal to the front face, the front faces of the bottom spars are in substantially the same plane as the top spar front face and the bottom spars each have a bottom face substantially orthogonal to the bottom spar front faces.

11. The router table fence of claim 10, wherein each of the top spar front and top faces and the bottom spar front and bottom faces have a longitudinal T-slot therein.

12. The router table fence of claim 1, further comprising means for fixing the fence to a router table top.

13. The router table fence of claim 12, wherein the fixing means comprises at least one clamp for attachment to the fence and engagement with the router table top.

14. The router table fence of claim 12, wherein the fixing means comprises two clamps, each of which clamp has a body for contact with the top of the router table top, and, attached to the body:

(a) a projection having a T-shaped cross section to be received in a T-shaped slot in the fence and (b) a foot through which a threaded rod extends to exert pressure against the underside of the router table top generally opposite the clamp body.

15. The router table fence of claim 1, further comprising a dust chute comprising:

(a) an inlet for positioning adjacent to the fence, (b) a tubular extension communicating with the inlet for attachment to a dust removal system or vacuum cleaner and (c) at least one magnet affixed to the chute for attachment of the chute to ferrous metal surfaces.

16. The router table fence of claim 1, further comprising a safety shield for attachment to the fence, the shield comprising a substantially transparent shield member attached to a vertical arm for fixation to the front of the fence in a position so that the shield member is positioned generally above a router cutter protruding through the router table top.

17. The router table fence of claim [1] *16*, wherein the safety shield is made of polycarbonate plastic.

18. The router table fence of claim 1, wherein the fence has a front and the fence further comprises a hold-down assembly for mounting on the fence, the hold-down assembly comprising a body to which there is attached:

means for exerting pressure against a top of a workpiece to urge it against the top of the router table top, and means for exerting pressure against a side of a workpiece to urge it against the front of the fence.

19. The fence of claim 18, wherein the fence has at least one T-slot and the hold-down assembly attaches to the fence by engaging a T-slot in the fence.

20. The router table fence of claim 1, further comprising a micro-adjust stop for accurately repositioning one end of the fence, comprising a stop body for attachment to the router table top and a positioning screw threaded through the body for contact with a face of the fence in a range of locations determined by the position of the screw within the body and the location of the body on the router table top.

21. The router table fence of claim 20, further comprising longitudinal and rotational position indicating means on the positioning screw and, attached to the body, a cursor for establishing the longitudinal and rotational position of the screw relative to the body by reference to the position indicating means so that changes in position of the screw can be accurately determined.

22. The router table fence of claim 20, further comprising spaced apart longitudinal marks around the circumference of the positioning screw and spaced apart annular rings on the positioning screw and, attached to the body, a transparent plate having cursor marks for establishing the longitudinal and rotational position of the screw relative to the body by reference to the longitudinal marks and the annular rings so that changes in position of the screw can be accurately determined.

23. The router table fence of claim 1, further comprising a fixed stop usable to establish the position of the fence on the router table top to make it possible to remove the fence from the router table top and later return it to the same position, comprising:

a section of rod penetrated by a slot within which an edge of the router table top may be received and a screw threaded into an axial, threaded hole in one end of the rod section so that an end of the screw may be tightened against a surface of the router table top when the edge of the router table top is received within the slot.

24. A router table fence for use with a router table top, comprising:

(a) a top spar and (b) two bottom spars, each of which spars:

(i) has a top face, bottom face and two side faces and (ii) is fabricated of extruded aluminum having a generally square cross-sectional shape with a laterally centered, longitudinal T-shaped slot in each face, and (iii) first structure on a first face of one of the spars for engagement with second structure on an opposite face of another of the spars so that the one spar can slidingly engage the other spar with at least a second face of the one spar maintained in substantially the same plane as a second face of the other spar.

25. The router table fence of claim 24, wherein the first structure comprises a pair of longitudinal ribs and the second structure comprises a second pair of longitudinal ribs in a position laterally offset from the first pair of ribs.

26. A method of accurately positioning a router table fence on a router table top relative to a router cutter protruding above the router table top, comprising the steps of:

(a) fixing the router table fence in a first approximately correct position on the router table top with fence locks that attach to the fence and table top on opposite sides of the table, (b) taking a first test cut in a workpiece by passing a portion of the workpiece through the revolving router cutter while maintaining the workpiece in sliding contact with the fence, (c) positioning a micro-adjust fence stop against the front or back of the fence at one edge of the router table top (d) loosening the fence lock adjacent to the one edge of the router table top, (e) measuring on the workpiece a distance the fence position needs to move relative to the router cutter, (f) using the micro-adjust stop to reposition the fence contacting the micro-adjust stop by twice the distance, and (g) tightening the fence lock adjacent to the one edge of the router table top.

*27. The router table fence of claim 1, wherein in use substantially the entire top spar is positioned higher above a router table than the bottom spars.*

*28. The router table fence of claim 1, wherein in use the bottom spars rest on a router table and the top spar rests on the bottom spars and does not contact the router table.*

*29. The router table fence of claim 1, wherein the top spar is positioned substantially entirely above the two bottom spars.*

*30. The router table fence of claim 29, wherein the bottom spars each have a top face substantially orthogonal to the bottom spar front faces, and the top spar has a bottom face substantially orthogonal to top spar front face, wherein the top faces of the bottom spars and the bottom face of the top spar engage so that the bottom spars can slide relative to the top spar.*

*31. The router table fence of claim 30, wherein the bottom face of the top spar comprises at least one rib and the top face of each of the bottom spars comprises at least one depression, wherein the at least one rib fits into the at least one depression of each bottom spar.*

*32. The router table fence of claim 30, wherein the bottom face of the top spar comprises at least one depression and the top face of each of the bottom spars comprises at least one rib, wherein the at least one rib of each bottom spar fits into the at least one depression of the top spar.*

*33. The router table fence of claim 30, wherein the top face of each bottom spar comprises a slot and the connectors comprise at least two screws, wherein each screw is positioned at least partially through the top spar and substantially parallel to the front face of the top spar and protrudes from the bottom face of the top spar and is positioned in the slot in the top face of one of the bottom spars.*

*34. The router table fence of claim 1, wherein each of the spars is an extrusion.*

*35. The router table fence of claim 1, wherein each of the spars is aluminum.*

*36. The router table fence of claim 1, wherein each of the spars is substantially the same width.*

*37. The router table fence of claim 1, further comprising a plastic end cap attached to an end of at least one spar.*

*38. The router table fence of claim 37, wherein the cross-sectional shape of the at least one spar forms a slot having an arcuate wall, wherein the plastic end cap is attached to the end of the at least one spar by at least one screw received in the slot.*

*39. The router table fence of claim 1, wherein the fence has a back side and separation of the opposed ends of the two bottom spars by a selected distance defines an opening between the opposed ends of the two bottom spars through which workpiece chips and dust may be removed from the back side of the fence.*

*40. The router table fence of claim 39, further comprising a dust chute attachable to a vacuum positioned at the opening on the back side of the fence.*

*41. The router table fence of claim 1, wherein the each of the bottom spars further comprises a back face and the top spar further comprises a back face and a top face, wherein each of the bottom spar front and back faces and the top spar front, back, and top faces has a longitudinal tee slot therein.*

*42. The router table fence of claim 1, further comprising a safety shield for attachment to the top spar, wherein the safety shield comprises a substantially transparent shield member.*

*43. The router table fence of claim 1, further comprising a first structure on a first face of one of the bottom spars for engagement with a second structure on an opposite face of the top spar so that the bottom spar can slidingly engage the top spar with at least a second face of the bottom spar maintained in substantially the same plane as a second face of the top spar, wherein each spar is fabricated of extruded aluminum having a generally rectangular cross-sectional shape.*

*44. The router table fence of claim 1, wherein a contact surface for a workpiece is associated with each of the two bottom spars, and the two contact surfaces are alternatively positionable in the same plane or in parallel planes.*

*45. A router table fence for use with a router tab top, comprising:*

*a. two bottom spars, each fabricated of extruded aluminum having a generally rectangular cross-sectional shape, each having substantially the same width, and each comprising a front face, a top face comprising at least one depression, and a back face, wherein the front, top, and back faces of each of the two bottom spars has a longitudinal tee slot therein;*

*b. a top spar substantially the entirety of which is positioned above the two bottoms spars when the fence is in use, wherein the top spar has a first length and is fabricated of extruded aluminum having a generally rectangular cross-sectional shape and having a width substantially the same as the width of each of the two bottom spars, wherein the top spar comprises a front face, a top face, and a back face, each face having a longitudinal tee slot therein and wherein the top spar further comprises a bottom face having at least one rib, wherein the at least one rib fits into the at least one depression of each bottom spar so that the bottom spars can slide relative to the top spar; and*

*c. connectors for attaching the bottom spars to the top spar so that:*

*(i) the front faces of each of the top spar and the two bottom spars are in substantially the same plane and*

*(ii) opposed ends of the two bottom spars may be positioned either:*

*(x) abutting, or*

*(y) separated by a selected distance to define an opening between the opposed ends of the two bottom spars through which workpiece chips and dust may be removed from a back side of the fence.*

* * * * *

US00RE38612F1

(12) EX PARTE REEXAMINATION CERTIFICATE (5635th)

United States Patent

Tucker et al.

(10) Number: US RE38,612 F1

(45) Certificate Issued: Dec. 19, 2006

(54) ROUTER TABLE FENCE SYSTEM

(75) Inventors: Edwin C. Tucker, Ottawa (CA); Michael S. McGuire, Ottawa (CA); Leonard G. Lee, Almonte (CA); John S. Lynn, Ontario (CA)

(73) Assignee: Lee Valley Tools Ltd., Ottawa (CA)

Reexamination Request:
No. 90/007,424, Feb. 16, 2005

Reexamination Certificate for:

| | |
|---|---|
| Patent No.: | **Re. 38,612** |
| Issued: | **Oct. 5, 2004** |
| Appl. No.: | **10/092,960** |
| Filed: | **Feb. 28, 2002** |

Related U.S. Patent Documents

Reissue of:

| | |
|---|---|
| (64) Patent No.: | **5,779,407** |
| Issued: | **Jul. 14, 1998** |
| Appl. No.: | **08/791,818** |
| Filed: | **Jan. 30, 1997** |

Related U.S. Application Data

(60) Provisional application No. 60/010,975, filed on Feb. 1, 1996.

(51) Int. Cl.

| | |
|---|---|
| ***B27B 31/00*** | (2006.01) |
| ***B23C 1/12*** | (2006.01) |

(52) U.S. Cl. ..... 409/218; 144/252.1; 144/253.1; 409/226; 269/303

(58) Field of Classification Search ..... None
See application file for complete search history.

(56) References Cited

U.S. PATENT DOCUMENTS 5,553,644 A * 9/1996 Adams ..... 144/253.2

OTHER PUBLICATIONS

JoinTech SMARTFENCE@ advertisement, Taunton's Fine Woodworking, p. 123, Oct. 1994.*

JoinTech, SMARTFENCE@ Plus Model SF–24 and SF–32 Owner's Manual, 1994.*

Scheppach Katalog, 1994, p. 1.*

(Continued)

*Primary Examiner*—Matthew C. Graham

(57) ABSTRACT

A router table fence having three nesting aluminum extrusions or spars, two of which lie under a longer third spar. By positioning the inner ends of the two lower spars adjacent to a router cutter protruding through a router table, it is possible to provide a fence, particularly when the lower spars are used with wood facings or sub-fences, that can be adjusted to closely surround the cutter. Lateral movement of the fence assembly adjusts the amount of cutter that contacts a workpiece manipulated past the cutter while contacting the fence. The cross sectional shapes of the spars are identical and are generally square, with structure that permits the upper, longer spar to rest on top of, and be attached in a manner permitting it to slide against, the lower two spars. T-shaped slots in each face of the spars accept fasteners that connect the spars together and also accept fasteners for a variety of accessories, such as hold-down devices and shields. Fence locks attach the fence to a variety of router table tops without the need for fence-receiving structures separately attached to the router table or table top. A micro-adjust stop can be used in cooperation with the fence locks to make very accurate and predictable adjustments in the position of the fence on a router table top. By using a shim behind one of the sub-fences in order to position it parallel to, but slightly offset from, the other sub-fence, it is possible to joint a surface of a board using a "straight" cutter.

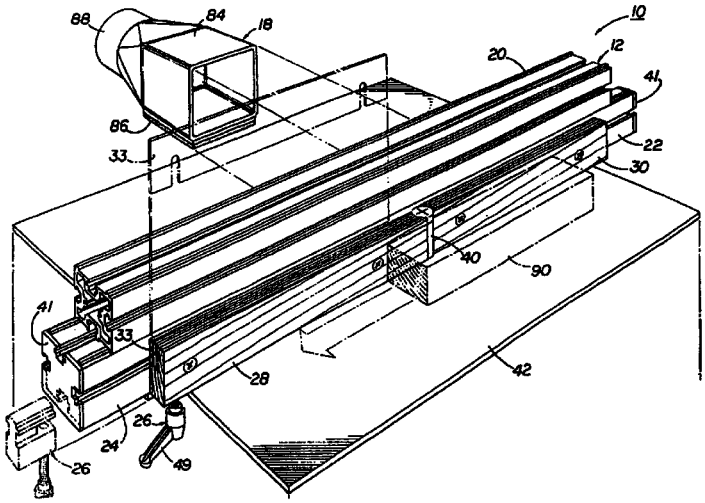

OTHER PUBLICATIONS

Jul. 2, 2001 letter to R. Warren Comstock, Esq. from Roger D. Greer of Greer, Burns & Crain, Ltd.
Exhibit 1: CRAFTSMAN® Professional Router Table Fence, Owner's Manual Model No. 9–26472.
Exhibit 2: U.S. Pat. No. 5,553,644 to Adams, entitled *Fence for Woodworking Machine,* issued Sep. 10, 1996.
Exhibit 3: Scheppach Katalog, 1994.
Exhibit 4: Taunton's Fine WoodWorking, Fence and Chip–Collection System, Oct. 1991 No. 90.
Exhibit 5: Taunton's Fine WoodWorking, Smart Fence Plus, Advertisement from JoinTech, Oct. 1994 No. 108.
Exhibit 6: Bench Dog.
Nov. 7, 2001 letter to R. Warren Comstock from John D. Gould of Merchant & Gould.
Exhibit 1: U.S. Pat. No. 5,779,407 to Tucker et al., entitled *Router Table Fence System,* issued Jul. 14, 1998.
Exhibit 2: CRAFTSMAN® Professional Router Table Fence, Owner's Manual Model No. 9–26472.
Exhibit 3: CRAFTSMAN® table fence photographs.
Exhibit 4: JoinTech, SMART FENCE® Plus Model SF–32 photographs.
Exhibit 5: JoinTech, SMART FENCE® Plus Model SF–32, Owners Manual.
Exhibit 6: JoinTech, Smart Fence Plus Mounting Brackets, SF–MB2, Parts List with instructions.
Exhibit 7: Taunton's Fine WoodWorking, Oct. 1994, p. 123 showing SMART FENCE® advertisement.
Exhibit 8: Taunton's Fine WoodWorking, Oct. 1991, showing SMART FENCE® advertisement.
Exhibit 9: American Woodworker Magazine, Reprint from Aug. 1995 Issue.
Exhibit 10: U.S. Pat. No. 5,553,644 to Adams, entitled *Fence for Woodworking Machine,* issued Sep. 10, 1996.
Exhibit 11: ShopNotes, 1992, No. 1, entitled *Complete Router Table*.
Exhibit 12: Prototype of Exhibit 11 Photographs.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–45 is confirmed.

* * * * *